(12) United States Patent
Liu et al.

(10) Patent No.: US 7,593,434 B2
(45) Date of Patent: Sep. 22, 2009

(54) COMPRESSION DESIGN FOR HIGH ENERGY SHORT PULSE FIBER LASER

(75) Inventors: Jian Liu, Sunnyvale, CA (US); Jiangfan Xia, Santa Clara, CA (US)

(73) Assignee: PolarOnyx, Inc., Sunnyvale, CA (US)

( * ) Notice: Subject to any disclaimer, the term of this patent is extended or adjusted under 35 U.S.C. 154(b) by 190 days.

(21) Appl. No.: 11/479,490

(22) Filed: Jun. 30, 2006

(65) Prior Publication Data

US 2007/0014317 A1    Jan. 18, 2007

Related U.S. Application Data

(60) Provisional application No. 60/696,372, filed on Jun. 30, 2005, provisional application No. 60/696,275, filed on Jul. 1, 2005.

(51) Int. Cl.
*H01S 3/30* (2006.01)
(52) U.S. Cl. .................. 372/6; 372/18; 372/25; 372/100; 372/102
(58) Field of Classification Search ........... 372/6, 372/18, 25, 100, 102
See application file for complete search history.

(56) References Cited

U.S. PATENT DOCUMENTS

| | | | | |
|---|---|---|---|---|
| 5,652,681 | A * | 7/1997 | Chen et al. | 359/831 |
| 6,081,543 | A * | 6/2000 | Liu et al. | 372/102 |
| 7,072,101 | B2 * | 7/2006 | Kapteyn et al. | 359/337.5 |
| 7,440,173 | B2 * | 10/2008 | Liu et al. | 359/337.5 |
| 2006/0120418 | A1 * | 6/2006 | Harter et al. | 372/30 |

* cited by examiner

*Primary Examiner*—Minsun Harvey
*Assistant Examiner*—Yuanda Zhang
(74) *Attorney, Agent, or Firm*—John M. Taboada

(57) ABSTRACT

A fiber Chirped Pulse Amplification (CPA) laser system includes a fiber mode-locking oscillator for generating a laser for projecting to a fiber stretcher for stretching a pulse width of the laser. The fiber CPA laser system further includes a multistage amplifier for amplifying the laser and a high-order dispersion compensating compressor for compensating high order dispersions and compressing the pulse width of the laser. The high-order dispersion compensating compressor further includes a pair of gratings coupled with a pair of prisms, a grating pair engraved on the surfaces of a pair of prisms, a chirped grating pair and a phase modulator consists of a grating and a deformable mirror, for generating a negative group velocity dispersion (GVD) and a negative third order dispersion (TOD) for the laser.

5 Claims, 2 Drawing Sheets functional block diagram with a compensator-compressor

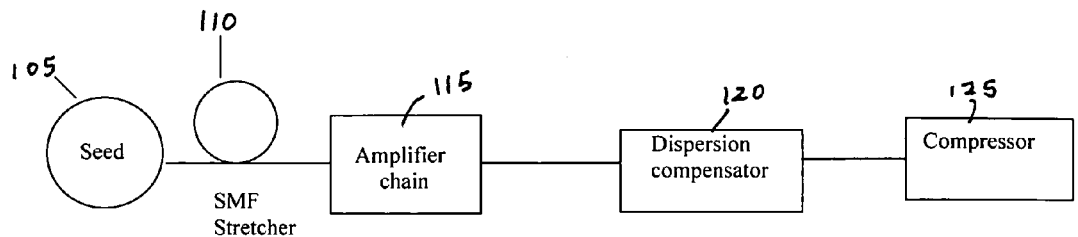
Fig. 1 functional block diagram with a compensator-compressor
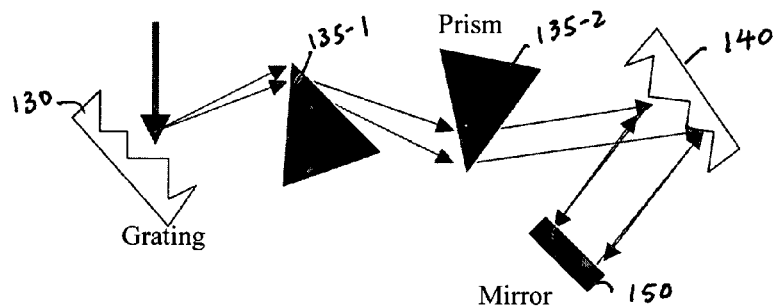
Figure 2 grating pair-prism pair combination for higher order dispersion compensator
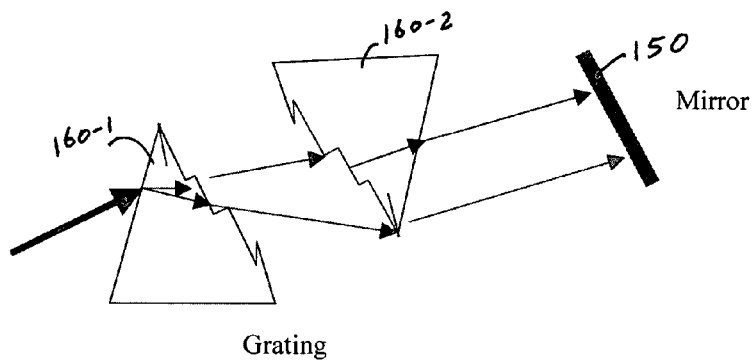
Figure 3 grating-prism pair for higher order dispersion compensator

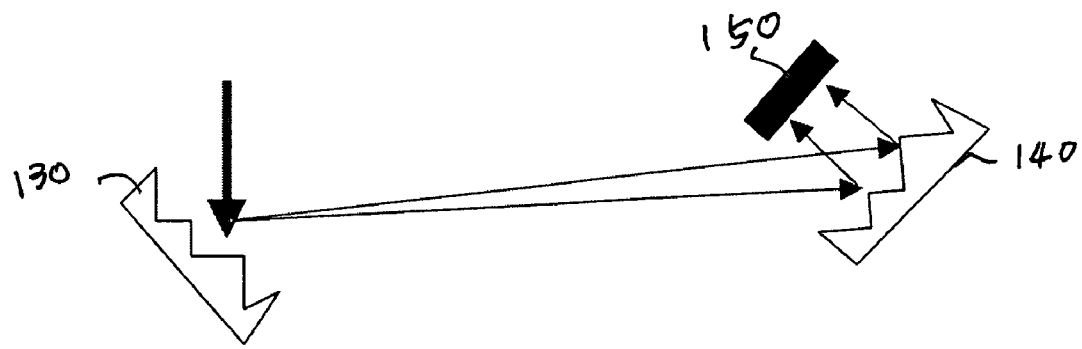
Fig.4 chirping grating for high order dispersion compensator
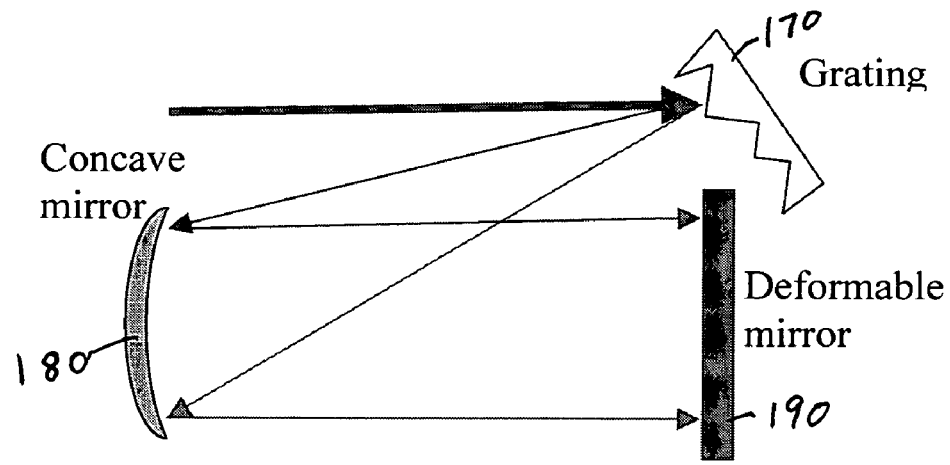
Figure 5 Schematic diagram of a deformable mirror for TOD compensation

COMPRESSION DESIGN FOR HIGH ENERGY SHORT PULSE FIBER LASER

This Formal Application claims a Priority Date of Jun. 30, 2005 benefit from two Provisional Patent Applications 60/696,372 and Jul. 1, 2005 benefit from another Provisional Patent Application 60/696,275 filed by the same Applicant of this Application. The disclosures made in 60/696,372 and 60/696,275 are hereby incorporated by reference in this Patent Application.

FIELD OF THE INVENTION

The present invention relates generally to apparatuses and methods for providing fiber laser system. More particularly, this invention relates a design for dispersion compensation in Chirped Pulse Amplification (CPA) fiber laser system.

BACKGROUND OF THE INVENTION

Even though current technologies of fiber laser have made significant progress toward achieving a compact and reliable fiber laser system providing high quality output laser with ever increasing output energy, however those of ordinary skill in the art are still confronted with technical limitations and difficulties. Specifically, in a fiber laser system implemented with the Chirped Pulse Amplification (CPA) for short pulse high power laser amplifier, the CPA systems are still limited by the technical difficulties that the third order dispersion (TOD) limits the scalability of the laser systems. Such limitations were not addressed in the conventional technologies due to the fact that the conventional solid-state laser utilizes Grating-Lens combination and Treacy compressor for pulse stretching and compressing. Ideally, in such solid-state systems, all orders of dispersion can be compensated, but the material dispersion can distort and damage this ideal situation. But the material dispersion is not a serious problem in solid-state laser system because the material dispersion is generally considered as not important. However, for a fiber laser system, the situation is different due to the fact that in the fiber laser systems, attempts are made by using the fiber stretcher to replace the grating-lens combination for the purpose of significantly increasing the system reliability. However, the TOD limits the ability for de-chirping when using Treacy compressor since both fiber stretcher and Treacy compressor have positive TOD even this combination can remove the second order dispersion completely. This issue of TOD dispersion makes it more difficult to develop a high-energy fiber laser amplifier with <200 fs pulse width. Actually, the technical difficulty of TOD dispersion is even more pronounced for laser system of higher energy. A laser system of higher energy requires a higher stretch ratio and that leads to a higher TOD. Therefore, for laser system of higher energy, it is even more difficult to re-compress the pulse to the original pulse width.

Therefore, a need still exists in the art of fiber laser design and manufacture to provide a new and improved configuration and method to provide fiber laser to compensate the dispersion generated in the laser system due to the TOD effects such that the above-discussed difficulty may be resolved.

SUMMARY OF THE PRESENT INVENTION

It is therefore an aspect of the present invention to provide a compensator for compensating the higher order dispersion including the dispersion caused by the TOD such that the above-discussed difficulties as that encountered in the prior art may be resolved.

It is another aspect of this invention that in order to further compensate a higher dispersion, a compensator is implemented in a fiber laser system that includes a pair of grating lenses and a pair of prisms as a combined compensator to compensate a higher order dispersion including the TOD such that a high quality, compact and reliable fiber laser system can be provided.

It is a further aspect of this invention that the higher order dispersions are compensated by a compensator implemented with a pair of prisms with grating surface. Particularly, the prisms are made of material of highly dispersive materials such that compact compensator can be produced to compensate the higher order dispersions.

It is a further aspect of this invention that the higher order dispersions are compensated with a compensator that comprises a deformable mirror that can be flexibly modulated by a controller implemented with compensation algorithms. A combined compensator implemented with a grating lens with the deformable mirror can provide higher degree of flexibility of dispersion compensations.

Briefly, in a preferred embodiment, the present invention discloses a fiber Chirped Pulse Amplification (CPA) laser system that includes a fiber mode-locking oscillator, a fiber stretcher, a multistage amplifier chain and a high-order dispersion compensated compressor.

In a preferred embodiment, this invention further discloses a method for overcoming the drawback in a fiber CPA laser system. We propose to generate high enough negative TOD in the compression stage of the CPA system to compensate the very large positive TOD generated inherently inside the conventional fiber stretcher and the fiber amplification chain.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 1 is a functional block diagram for showing a fiber laser system implemented with a compensator-compressor of this invention.

FIG. 2 shows a grating pair-prism pair combination for higher order dispersion compensator.

FIG. 3 shows a grating-prism pair for higher order dispersion compensator.

FIG. 4 is a schematic diagram for showing a chirping grating implementing a high order dispersion compensator.

FIG. 5 is a schematic diagram of a deformable mirror for higher order dispersion compensation and particularly for TOD compensation.

DETAILED DESCRIPTION OF THE INVENTION

Referring to FIG. 1 for a schematic diagram of a fiber laser system 100 of this invention that implements a dispersion compensator of this invention. The laser system 100 includes a laser seed 105 for generating a seed laser for projecting into a laser stretcher 110 to stretch the laser pulse. The stretcher 110 generates laser pulse with stretched pulse width is projected into a series of laser amplifiers 115 to amplify the laser into higher energy. The amplified laser is then projected into a TOD compensator 120 of this invention to compensate the dispersions generated due to the TOD effects. The amplified and TOD compensated laser outputted from the dispersion compressor 120 are then projected to a pulse compressor 125 to re-compress the pulse width of the laser to output a laser with original pulse width.

The device of a TOD compensator 120 shown in FIG. 1 can be implemented in many configurations. Referring to FIG. 2 for a first embodiment that includes a configuration is a combination of prism pairs with grating pair as that shown in FIG. 2. Referring to FIG. 2, for a dispersion compensator and compressor 120 of this invention. The compensator-compressor 120 includes a first grating lens 130 to receive and disperse an incident laser beam from the amplifier 115. The dispersed beam from the grating lens 130 passes through a pair of prisms 135-1 and 135-2 to project toward a second grating lens 140 to project to a mirror 150. The mirror 150 then reflects back the incident laser through a reverse optical path to the grating lens 140 then the prism lenses 135-2, 135-1 and then through the first grating lens 130 to output a compensated and compressed laser beam with certain displacement. The setup in FIG. 2 is taking advantage of a pair of grating-lens combination employed in a stretcher stage of a solid-state CPA laser system. The grating lens combination as shown in FIG. 2 when the grating lies within the focal length of the lens; the grating lens combination performs a special optical function of changing all the signs of all orders of dispersion. On the other hand, the prism pair 135-1 and 135-2 as implemented in the compensator of the present invention provides negative dispersions to compensate the positive dispersions accumulated in the fiber stretcher stage and the fiber amplification chain. Specifically, as shown in FIG. 2, the function of the compensator 120 is carried out by using two grating lenses 130 and 140 to change all the signs of different orders of dispersion and meantime, implementing the pair of prisms 135-1 and 135-2 to compensate the higher order dispersions.

Such compensation functions can be better understood by the following detail descriptions. It is a general practice to implement a grating compressor to provide negative group velocity dispersion (GVD) and the negative GVD then compensates the positive GVD generated in the fiber stretcher and the fiber amplifier chain. This GVD can be defined as:

$$\left.\frac{d^2\varphi}{d\omega^2}\right|_{\omega_0} = -\frac{\lambda_0^3}{2\pi c^2 d^2}\frac{L}{\cos^2(\beta)} \quad (1)$$

Where d is the grating groove spacing, L is the grating distance and β is the diffraction angle. The third order dispersion (TOD) is the third order derivative. Under the Littrow diffraction condition, the TOD and GVD always have different signs. On the other hand, the fiber stretcher has positive GVD and TOD. If the total GVD is zero, the total TOD adds up. Under the condition when GVD is zero, the adding-up of the TOD inevitably leads to the TOD problem.

However, the prism pair can have negative GVD and TOD simultaneously. Supposing the Brewster angle and exit angles, the GVD is:

$$\left.\frac{d^2\varphi}{d\omega^2}\right|_{\omega_0} = -4L\frac{\lambda_0^3}{2\pi c^2}\left(\left.\frac{dn}{d\lambda}\right|_{\lambda_0}\right)^2 + A\frac{\lambda_0^3}{2\pi c^2}\left.\frac{d^2n}{d\lambda^2}\right|_{\lambda_0} \quad (2)$$

where A is the prism insertion depth, L is the prism apex distance. Under normal dispersion, the TOD and GVD for the prism pair have same signs.

A calculation is carried out to calculate the GVD and TOD for fiber, prism pair and grating pair, with different length and distance. Table 1 lists the calculation results. It shows that the total dispersion is proportional to the fiber length and the distance of the grating pair or prism pair. The calculation also shows that for different material, the dispersion is different for same distance. The larger the dispersion of the material is, the larger the total TOD and GVD will be. This calculation shows under proper condition, it is possible to cancel the GVD and TOD of the fibers with the compressor, or at least minimize the influence of the TOD. From the results, it is also noticed that the importance to choose highly dispersive prisms. The SF10 prism pair can generate much higher negative TOD than the fused silica prism pair.

TABLE 1

TOD and GVD for fibers, prism and grating pair

| Device | λ(nm) | GVD(fs$^2$) | TOD(fs$^3$) |
|---|---|---|---|
| 200 m SMF 28 | 600 | $1.1 \times 10^7$ | $4.9 \times 10^6$ |
| | 800 | $7.2 \times 10^6$ | $5.5 \times 10^6$ |
| | 1030 | $3.8 \times 10^6$ | $8.1 \times 10^6$ |
| Brewster Prism Pair | 600 | −850 | −1300 |
| L = 50 cm, fused silica | 800 | −540 | −610 |
| | 1030 | −320 | −160 |
| Brewster Prism Pair | 600 | $-1.6 \times 10^5$ | $-2.1 \times 10^5$ |
| L = 50 cm, SF10 | 800 | $-5.2 \times 10^4$ | $-7.7 \times 10^4$ |
| | 1030 | $-2.3 \times 10^4$ | $-3.7 \times 10^4$ |
| Grating pair | 600 | $-5.8 \times 10^4$ | $5.9 \times 10^4$ |
| L = 20 cm; d = 1.7 μm | 800 | $-1.4 \times 10^5$ | $2.0 \times 10^5$ |
| Littrow angle incidence | 1030 | $-3.2 \times 10^5$ | $6.4 \times 10^5$ |
| Grating pair | 600 | $-2.7 \times 10^5$ | $3.3 \times 10^5$ |
| L = 20 cm; d = 0.8 μm | 800 | $-7.7 \times 10^5$ | $1.6 \times 10^6$ |
| Littrow angle incidence | 1030 | $-2.3 \times 10^6$ | $8.4 \times 10^6$ |

In this embodiment, the central idea is to find a highly dispersive prism, like SF10 prism, or chalcogenide prism, or even more dispersive material to get a compact TOD compensator, which can minimize the residual TOD.

FIG. 3 illustrates an alternate embodiment of the invention by implementing the compensator-compressor 120 as a pair of specially configured grating prism 160-1 and 160-2 with one of the prism surface as a grating surface 165-1 and 165-2 respectively to compensate and compress the incident laser beam. In this embodiment, the central idea is to find a highly dispersive prism, like SF10 prism, or chalcogenide prism, or even more dispersive material to get a compact TOD compensator. The configuration shown in FIG. 3 is a direct extension of FIG. 2 since it also combines the grating pair and prism pair, however, this extension might change the incidence angle of the grating pair, which will totally change the compensator-compressor theory and application. Here the prism pair structure induced negative TOD may be trivial, instead, the central idea is that the ratio and the sign of TOD/GVD of this compensator-compressor can be modified by this configuration. This setup is named as the prism pair and the design and application detail will be further described in another patent application as a continuation of this patent application later.

FIG. 4 shows another embodiment of this invention that implements chirped grating pairs. This setup looks like a conventional grating pair compressor; however, the two gratings are perpendicular, instead of being parallel. This is because the grating is different with the conventional grating. The incident laser beam is projected to a grating 130 first. The dispersed beam from grating 130 projects toward a second grating 140, and projects onto a mirror 150. The mirror 150 then reflects back the incident laser through a reverse optical path to the grating 140 then through the first grating 130 to output a compensated and compressed laser beam with certain displacement. The grating 130 and 140 is applied to chirp the groove density on the grating for the purpose of compensating the dispersions caused by the TOD effects. Basically the grating for the CPA application has uniform groove density; however, since the short pulse from the fiber laser has very stable phase structure, and therefore as a consequence also has stable TOD. For this reason, it is possible to remove the TOD by modulating the groove density distribution on the grating surface on the grating 130 to match and to remove the phase structure in the fiber laser pulses. For this reason, careful analysis of the phase structure of the laser pulse must be performed to determine the groove density of the grating 130. Furthermore, the implementation in grating can be difficult if there is a requirement to modulate the groove density continuously. Such limitation can be overcome by replacing the continuous modulation by a series of steps. For example, it is not practical to produce exact groove density distribution to match the phase structure of the short fiber laser pulses; however, if we target the TOD, we can use a linear chirp to achieve a zero TOD. Linearly chirped grating is TOD and fourth-order dispersion (FOD) free. Here the linear chirp means the groove density varies along the grating diffraction direction linearly. Again, a continuous linear chirp is still not practical; we can use 50 or more steps to simulate the linear variation. Of course, nonlinearly chirping the grating can offer more freedom to control the phase, this enable us to push the compression to limit, or to generate laser pulses of any shape.

FIG. 5 illustrates a configuration where a deformable mirror 190 is used to receive a light projected from the grating 170 to a concave mirror 180 and then to the deformable mirror 190. After the grating 170, the short pulse is diffracted; different spectral component goes to different direction. The concave mirror collects the divergent beam and forms a wide collimated beam with different spectral components projected in parallel. With the use of the deformable mirror 180 in this embodiment, modulating the deformable mirror can compensate the dispersions caused by the fiber related TOD. The configuration is more convenient to implement than determine and configure the grating 170 with particular groove configuration. Since the deformable mirror can be controlled electrically, it is achievable by the application of genetic algorithm to compensate the TOD, or even higher order dispersion. The central idea is that this deformable mirror is a phase modulator; with the change of the optical path for the different spectral component, it can generate any shape of spectral phase inside the short pulses. FIG. 5 shows an exemplary embodiment that uses the deformable mirror in fiber CPA system for TOD compensation. It is noticeable that the setup in FIG. 5 must be combined with a conventional grating pair compressor. Or it can be combined with the setup in FIG. 2-4 to further reduce the residual TOD.

According to above descriptions and figures, this invention discloses a fiber laser system for projecting a laser in said fiber laser system with a pulse width stretching and dispersion. The fiber laser further includes a high-order dispersion compensating compressor for compensating high order dispersions and compressing the pulse width of the laser. In a preferred embodiment, the high-order dispersion compensating compressor further includes a pair of gratings coupled with a pair of prisms for generating a negative group velocity dispersion (GVD) and a negative third order dispersion (TOD) for the laser. In a preferred embodiment, the high-order dispersion compensating compressor further includes a pair prisms each having a grating surface for generating a negative group velocity dispersion (GVD) and a negative third order dispersion (TOD) for the laser. In a preferred embodiment, the high-order dispersion compensating compressor further includes a pair of prisms for generating a negative group velocity dispersion (GVD) and a negative third order dispersion (TOD) for the laser. In another preferred embodiment, the high-order dispersion compensating compressor further includes a grating coupled to a deformable mirror for generating negative third order dispersion (TOD) for the laser. In another preferred embodiment, the high-order dispersion compensating compressor further includes a pair of chirping gratings having two mutually perpendicular gratings for generating a negative group velocity dispersion (GVD) and a zero third order dispersion (TOD) for the laser. In another preferred embodiment, the high-order dispersion compensating compressor further includes mirror for reflecting the laser back to the pair of grating for projecting through a reverse optical path. In another preferred embodiment, the high-order dispersion compensating compressor further includes concave mirror for receiving and projecting the laser from the grating for projecting to the deformable mirror. In another preferred embodiment, the high-order dispersion compensating compressor further includes mirror for reflecting the laser back for projecting through a reverse optical path to the pair of prisms with the mutually perpendicular gratings. In another preferred embodiment, the high-order dispersion compensating compressor further includes mirror for reflecting the laser back for projecting through a reverse optical path to the pair of grating coupled to the pair of prisms. In another preferred embodiment, the high-order dispersion compensating compressor further includes a prism composed of high dispersive material. In another preferred embodiment, the high-order dispersion compensating compressor further includes a prism composed of high dispersive material of SF10.

This invention further discloses a method of configuring a fiber CPA laser system for compensating high order dispersions. The method includes a step of generating negative a group-velocity dispersion (GVD) and a negative TOD in a compression stage of the CPA system. In another preferred embodiment, the step of generating the negative GVD and the negative TOD further comprising a step of implementing a pair of prisms for generating a negative GVD and a negative TOD. In another preferred embodiment, the step of generating the negative GVD and the negative TOD further comprising a step of implementing a pair of prisms each with a grating surface for generating the negative GVD and TOD. In another preferred embodiment, the step of generating the negative GVD and the negative TOD further comprising a step of implementing a pair of grating coupled to a pair of prisms for generating the negative GVD and TOD. In another preferred embodiment, the step of generating the negative GVD and the negative TOD further comprising a step of implementing a grating coupled to a deformable mirror for generating the negative TOD. In another preferred embodiment, the step of generating the negative GVD and zero TOD further comprising a step of implementing a pair of mutually perpendicular grating pairs for generating the negative GVD and TOD.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A fiber-based Chirped Pulse Amplification (CPA) laser system comprising:
   a. a fiber-based mode-locking oscillator configured to generate a first laser pulse having a first pulse width;
   b. a fiber-based stretcher configured to stretch the laser pulse to produce a second laser pulse having a second pulse width longer than the first pulse width;
   c. an amplifier configured to amplify the second laser pulse to produce an amplified laser pulse; and
   d. a dispersion-compensating compressor comprising:
      i. a first grating configured to diffract the amplified laser pulse from the amplifier;
      ii. a first prism configured to refract the amplified laser pulse from the first grating;
      iii a second prism configured to refract the amplified laser pulse from the first prism;
      iv. a second grating configured to diffract the amplified laser pulse from the second prism; and
      v. a mirror configured to reflect the amplified laser pulse from the second grating to produce a reflected amplified laser pulse, wherein the second grating is configured to diffract the reflected amplified laser pulse from the mirror to the second prism, wherein the second prism is configured to refract the reflected amplified laser pulse from the second grating, wherein the first prism is configured to refract the reflected amplified laser pulse from the second prism, and wherein the first grating is configured to diffract the reflected amplified laser pulse from the first prism to produce an output laser pulse having a third pulse width shorter than the second pulse width, wherein the dispersion-compensating compressor is configured to compensate a high order dispersion in the amplified laser pulse and to compress the amplified laser pulse.

2. The fiber-based CPA laser system of claim 1, wherein the first grating is formed on a surface of the first prism.

3. The fiber-based CPA laser system of claim 1, wherein the second grating is formed on a surface of the second prism.

4. The fiber-based CPA laser system of claim 1, wherein the dispersion-compensating compressor is configured to produce a negative or substantially zero third order dispersion (TOD) in the amplified laser pulse.

5. The fiber-based CPA laser system of claim 1, wherein the dispersion-compensating compressor is configured to produce a negative group velocity dispersion (GVD) in the amplified laser pulse.

* * * * *